Figure 1:
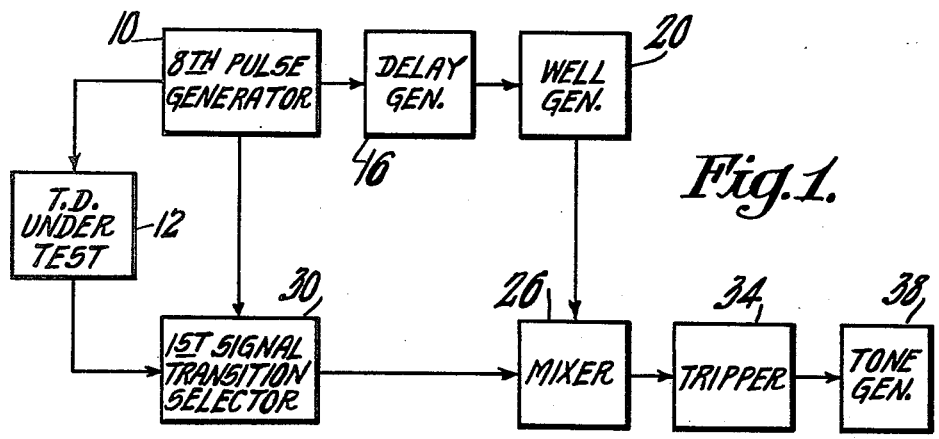

Aug. 31, 1954    A. LIGUORI ET AL    2,688,051
TIME MEASURING DEVICE FOR TELEGRAPH APPARATUS
Filed March 31, 1953    3 Sheets-Sheet 1

INVENTORS
ANTHONY LIGUORI
EUGENE R. SHENK
& HAJIME J. KISHI
BY Charles H. Brown
ATTORNEY

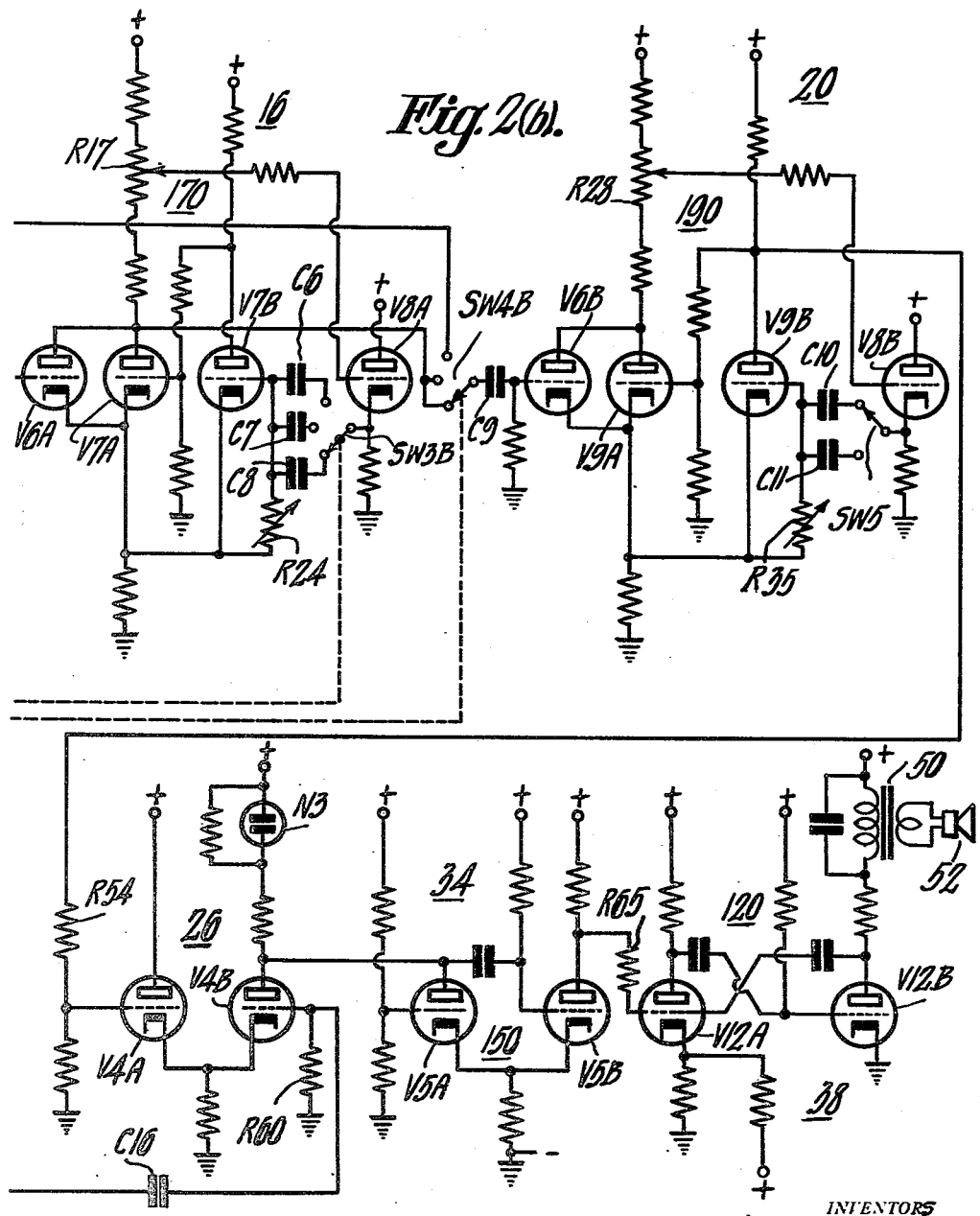

UNITED STATES PATENT OFFICE 2,688,051

TIME MEASURING DEVICE FOR TELEGRAPH APPARATUS

Anthony Liguori, Hackensack, and Eugene Richard Shenk, Bergenfield, N. J., and Hajime James Kishi, New York, N. Y., assignors to Radio Corporation of America, a corporation of Delaware Application March 31, 1953, Serial No. 345,842

The terminal 15 years of the term of the patent to be granted has been disclaimed 9 Claims. (Cl. 178—69)

The invention relates to circuit arrangements for measuring the operating time of mechanical telegraph apparatus. It particularly pertains to a device for measuring the elapsed time and the variations in elapsed time between the application of an energizing pulse and a given signal element transition in the output signal of a relaxation controlled telegraph transmitter distributor.

A relaxation controlled transmitter distributor (TD) is one in which both the movement of a paper tape which is punched with holes indicative of intelligence to be transmitted and also the transmission of a character from the tape are initiated by a "local operate" or an "eighth" pulse actuating a solenoid associated with the transmitter distributor mechanism. The armature associated with the solenoid is normally at rest.

Upon the arrival of an "eighth" pulse, a clutch engages a rotating member, the distributor brush arm makes one revolution over a face plate and comes to rest again. Before there is any electrical output the following steps must take place: the eighth pulse must energize the solenoid, the armature must pull up, a clutch has to engage a rotating member and the brush arm has to travel a portion of the stop segment of the transmitting distributor faceplate before it encounters the start segment. This sequence of steps results in a delay from the time of application of the eighth pulse to the start of the first signal element. The energizing time and the armature travel time are reasonably constant but the clutch engagement time varies. The variation depends on the number of teeth in each member of the clutch, the relative position of the teeth when contact is made, and certain spring tensions which may tend to accentuate or decrease clutch bounce.

The signals from these relaxation controlled transmitter distributors are often applied to circuits where the aforementioned time delays and variations must remain within certain limits to achieve proper operation of those circuits.

Heretofore, the testing of transmitter distributors was accomplished by applying the output signal of the unit to be tested to an associated component of telegraph apparatus, such as an electro-mechanical multiplex transmitting terminal and by observing with the aid of an oscilloscope, the drift of the TD signal with respect to "eighth" pulses locally generated in the associated component. An estimate could probably be made as to the extent of the drift, or variation, as it was previously called, in elapsed time. An estimate as to the smallest elapsed time, that is, the minimum delay time, was extremely difficult to make.

An object of the invention is to provide accurate electronically operated means to measure the minimum elapsed time from the transmission of an "eighth" pulse to the start of the first signal element produced by a relaxation type transmitter-distributor.

Another object of the invention is to provide means to measure the variation in clutching time over an extended period of operation of a relaxation transmitter distributor.

A further object of the invention is to produce an electronic circuit arrangement in accordance with the foregoing objects which is simple in operation and adjustment.

A more specific object of the invention is to provide a circuit arrangement according to the foregoing object which provides visual and aural indications of the desired information.

The objects of the invention are attained by means of an electronic circuit arrangement incorporating a circuit generating a train of time reference pulses which are applied to the transmitter distributor under test, a circuit adjustably delaying the time of occurrence of the reference pulses including means for directly determining the degree of delay, a circuit coupled to the delay circuit to produce pulses of adjustable time duration including means for directly determining the time duration, a signal element transition detector circuit to which the output signal of the transmitter distributor is applied to detect the occurrence of the start of the first signal elements of each of the characters, a mixer circuit biased by the pulses of adjustable time duration and to which the detected transitions are applied, and circuits responsive to detected transitions applied outside the limits of the adjustable pulses for indicating when the delay time is adjusted to the time of the earliest transition after the reference pulses initiate operation of the transmitter under test and when the duration of the adjustable pulse is of time duration equal to the maximum variation in occurrence of the earliest transition.

Figure 3:
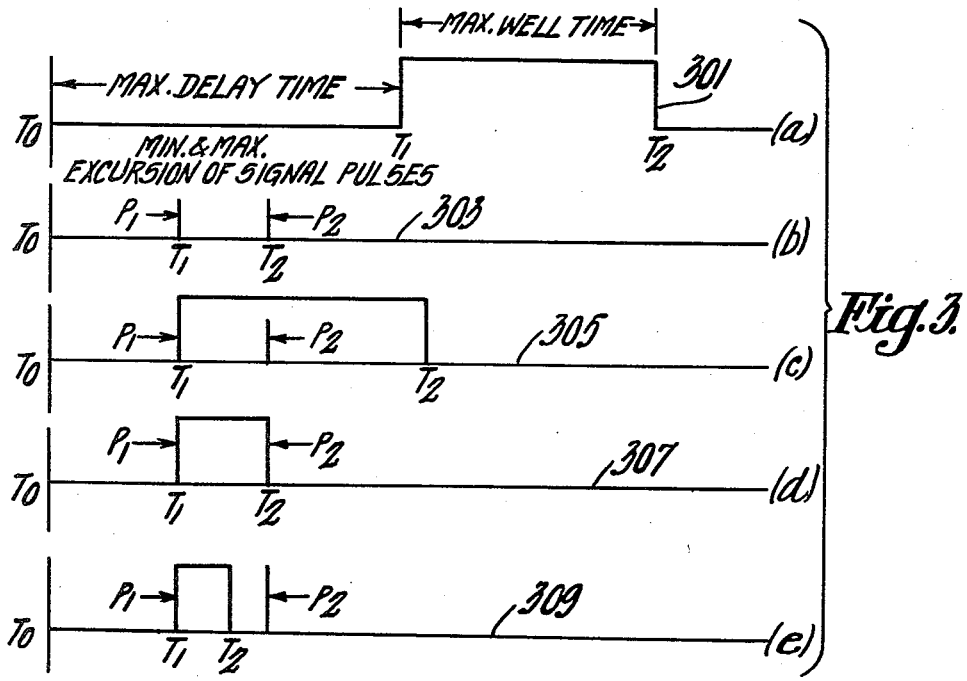

The invention will be described with reference to a particular embodiment thereof, given by way of example only, and illustrated by the accompanying drawing in which:

Fig. 1 is a functional diagram of a circuit arrangement according to the invention;

Fig. 2 (sections 2a and 2b being taken together) is a schematic diagram of a circuit arrangement for performing the functions of the arrangement as shown in Fig. 1; and Fig. 3 is a graphical representation of pulse forms obtained with the circuit arrangement shown in Fig. 2.

According to the invention, the minimum elapsed time and the variations in this time due to clutching are readily determined by the seven circuits shown in the functional diagram of Fig. 1.

An "eighth" pulse generator 10 is arranged to generate a train of operating pulses at a regular rate at a frequency approaching that used in normal operations. These operating pulses serve as a time reference and are applied both to the transmitter distributor 12 under test and to the time-measuring circuits in the time-measuring device.

A delay generator 16 arranged to operate in response to applied time reference or operating pulses consists of a monostable reciproconductive circuit the active time of which can be varied by means of a convenient control.

As employed herein the term "reciproconductive circuit" is construed to include all regenerative multi-tube circuits in which conduction is alternated between two of the tubes or electron flow path devices. The term "multivibrator" is aptly applied to the free-running or astable reciproconductive circuit but has been so loosely applied to other forms as to cause confusion. The monostable reciproconductive circuit, which is often, but not consistently, referred to as a "flip-flop," a "trigger circuit," or a "mono-stable multivibrator," is one in which one tube normally conducts in the stable state in which the conducting tube is blocked in response to applied triggering potential, placing the circuit in the quasi-stable state for a time depending on the constants of the circuit after which the second tube restores the circuit to the one stable state. The terms "locking circuit" and "lockover circuit," "scale-of-two," and "binary circuit" are sometimes more consistently applied to the bistable reciproconductive circuit, which is one in which two triggers are required to switch from one stable state to another stable state and return.

Preferably the active time of the delay generator can be read directly in milliseconds from a dial associated with the control. The delay generator 16 is used to measure the smallest time, that is, minimum delay between the transmission of the "eighth" pulse and the first signal element output of the TD. It is fired by a pulse from the "eighth" pulse generator 10. Upon restoration of the monostable reciproconductive circuit in the delay generator 16 a pulse is applied to a generator 20 of adjustable length gating pulses termed a "well" generator.

The gating pulses or "well" generator 20 consists of a monostable reciproconductive circuit the active time of which can be varied by means of another convenient control. The active time of this reciproconductive circuit can also be read directly in milliseconds from a dial associated with the corresponding control. This generator 20 is used to measure the clutching range; that is, the variations brought about by the random engagement of the clutch in the TD. When the "well" generator is adjusted, the active time is the same as the maximum variation in response time of the TD. While the monostable reciproconductive circuit is in the active condition, a positive pulse is being applied to a mixer circuit 26, where it is mixed with a pulse obtained from a first signal transition selector 30 coupled to the signal output terminals of the TD12 under test.

The first signal transition selector 30 is a bistable reciproconductive circuit conditioned by a pulse from the "eighth" pulse generator 10, that is, it is triggered to one of the two stable conditions by the "eighth" pulse. It is restored to the other stable condition by the very first mark-to-space transition in the signal from the TD12. Upon restoration of the selector 30, a short pulse corresponding in time to the transition is applied to the mixer circuit 26.

The purpose of the mixer circuit 26 is to gate the corresponding transition pulses from the first signal transition selector 30, depending on the polarity of the pulse from the well generator 20.

When the pulses are allowed to pass, a monostable reciproconductive circuit termed "tripper" circuit 34 is triggered. Its function is to stretch the pulse for observation purposes. An indicating device, preferably in the form of a neon glow lamp which glows when the tripper circuit 34 is in its active position is interposed in one of the anode circuits of the tripper circuit 34. This lamp provides a visual indication of the correctness of the settings of the abovementioned controls. The anode voltage of another part of the tripper circuit is applied to another indicating device in the form of a tone generator 38.

The tone generator 38 is an astable reciproconductive circuit. An output transformer forms part of the anode load circuit of one of the tubes, to drive a dynamic loud speaker. The tone generator 38 generates a tone only when the tripper circuit 34 is in the active condition. The tones from the speaker provide an aural indication of the correctness of the settings of the controls mentioned above.

The schematic diagram of Fig. 2 shows an example of a circuit arrangement for measuring the aforementioned timing characteristics of relaxation transmitter-distributors. As shown in this figure, the "eighth" pulse generator 10 consists of an astable reciproconductive circuit 110, a relay tube V11, a relay RY and associated components. Two triodes V10A and V10B are connected in a circuit having values at which the conducting time of the tube V10A is approximately either 160 milliseconds or 298 milliseconds, depending on the position of switch section SW3A of a range switch SW3. The conducting time of the tube V10B is approximately 35 milliseconds, which represents the approximate duration of the "eighth" pulses applied to the TD during normal operation. A relay tube V11 is connected to the grid of the tube V10B and follows as a slave tube. Whenever the tube V10B conducts, the slave tube V11 conducts through the relay coil RY1 in the common anode circuit. Current passing through the relay coil RY1 causes the relay contacts RY2 to close and if a TD has been properly connected, current will flow from the +120 volt line, through the milliammeter 40, through the adjustable resistor R3 and by way of the "eighth" pulse terminals 42, 43, through the "eighth" pulse coil of the TD. This will energize the magnet in the TD and the brush arm will make one revolution over the faceplate.

Each time current flows through the "eighth" pulse coil, a voltage pulse is developed across the coil at the terminals 42, 43 and is applied through a resistor R13 and a capacitor C5 through position 1 of a section SW4A of the function switch SW4 to the grid of a triode V6A in the delay generator circuit. A clamping diode V1A is connected between the resistor R13 and ground to prevent overshooting of the pulses applied to the grid of the triode V6A. If the diode V1A were not present to clamp the lead between the resistor R13 and the capacitor C5 to ground after a positive pulse has passed, the lead would go negative for a time and as the lead then would rise to zero potential, differentiation would produce a positive going pulse. This latter pulse might be of sufficient value to trigger the delay generator 16, were it not for the diode V1A.

Since it is a positive pulse, the tube V6A is caused to conduct and trigger the delay generator 16 comprising a monostable reciproconductive circuit 170 composed of the tubes V7A, V7B, V8A and associated components. This circuit is an improvement over a more commonly used monostable reciproconductive circuit. The active time or "time-constant" of the circuit is determined by the values of the capacitor C6, the resistor R24 and the voltage developed across the adjustable resistor R24. It is desirable to have the voltage developed across the resistor R24 independent of the resistance value of the resistor R24. A cathode follower tube V7B is connected between the anode of the first reciproconductive tube V7A and the time-constant determining components C6 and R24. This acts as a low impedance generator for the pulse developed through the capacitor C6 across the resistor R24. Among the advantages provided by this cathode follower type of monostable reciproconductive circuit are isolation of any loading of the capacitor C6 on the anode of the tube V7A, thereby assuring a more rapid positive rise of potential at this anode, and the provision of a much lower impedance generator to assure complete recharging of the capacitor C6 during the non-conducting time of tube V7A. The active time is variable from two milliseconds to ten milliseconds. Preferably, the potentiometer R24 has a linear taper over the calibrated range. In practice, fixed resistors are used in conjunction with a linear taper potentiometer to provide the desired range of control. Another adjustable resistor R17 in the anode circuit of tube V7A is used for calibration, as will be explained later.

When the circuit restores itself to its stable condition, that is, the tube V7B conducting and the tube V7A blocked or non-conducting, a positive pulse from the anode of the tube V7A is coupled through a switch section SW4B and a capacitor C9 to the grid of control tube V6B. The control tube V6B conducts and triggers the "well" generator 20, which is a monostable reciproconductive circuit 190 comprising three tubes V9A, V9B, V8B and associated components. The operation of this circuit is exactly the same as for the circuit previously explained. The anode voltage of the tube V9B is applied through a resistor R54 to the grid of a tube V4A. The reciproconductive tube V9B is normally conducting and the anode is at a low potential. When the monostable reciproconductive circuit is triggered and is in the active or unstable condition, the tube V9B is cut off and the anode is at approximately +150 volts. A positive pulse has thus been created. The leading edge of the positive pulse is determined by the active time of the delay generator 16. The trailing edge of the pulse is determined by the active time of the well generator 20. A pulse has thus been generated which can be varied in duration and which can also be varied in time with respect to a reference, that is, the "eighth" pulse applied to the TD. This variable length, variable phase, positive pulse is applied to mixer 26 at the grid of the tube V4A. The grid and cathode of the tube V4A follow the anode voltage excursion of the tube V9B. When the anode of the tube V9B is highly positive, the grid and cathode of the mixer tube V4A are highly positive. Since the cathode of the tube V4B is connected directly to the cathode of the tube V4B, a highly positive cathode acts as a large bias voltage for the tube V4B. When the reciproconductive tube V9B is conducting, the anode voltage is low and the grid and the cathode of the tube V4A are only slightly positive. The effect is a small bias voltage on the tube V4B. The source of pulses to the grid of the tube V4B will now be described.

As previously explained, an "eighth" pulse applied to a TD will cause the brush arm of the TD to make one revolution. The brush rides over a segmented faceplate. The TD most commonly used has seven segments for generating seven signal elements; a start element, a stop element and five elements for conveying intelligence. The polarity of the five elements is determined by the presence or absence of holes in the tape fed to the TD. The brush is normally contacting the stop segment, and when the brush arm starts to rotate, the very next segment encountered is the start segment. The stop and start segments universally are of fixed and opposite polarity. Thus, in the output signal there is always a transition when the brush goes from the stop segment to the start segment. This transition is used in the determination of the delay time and the clutching range of the TD under test.

Figure 2A:
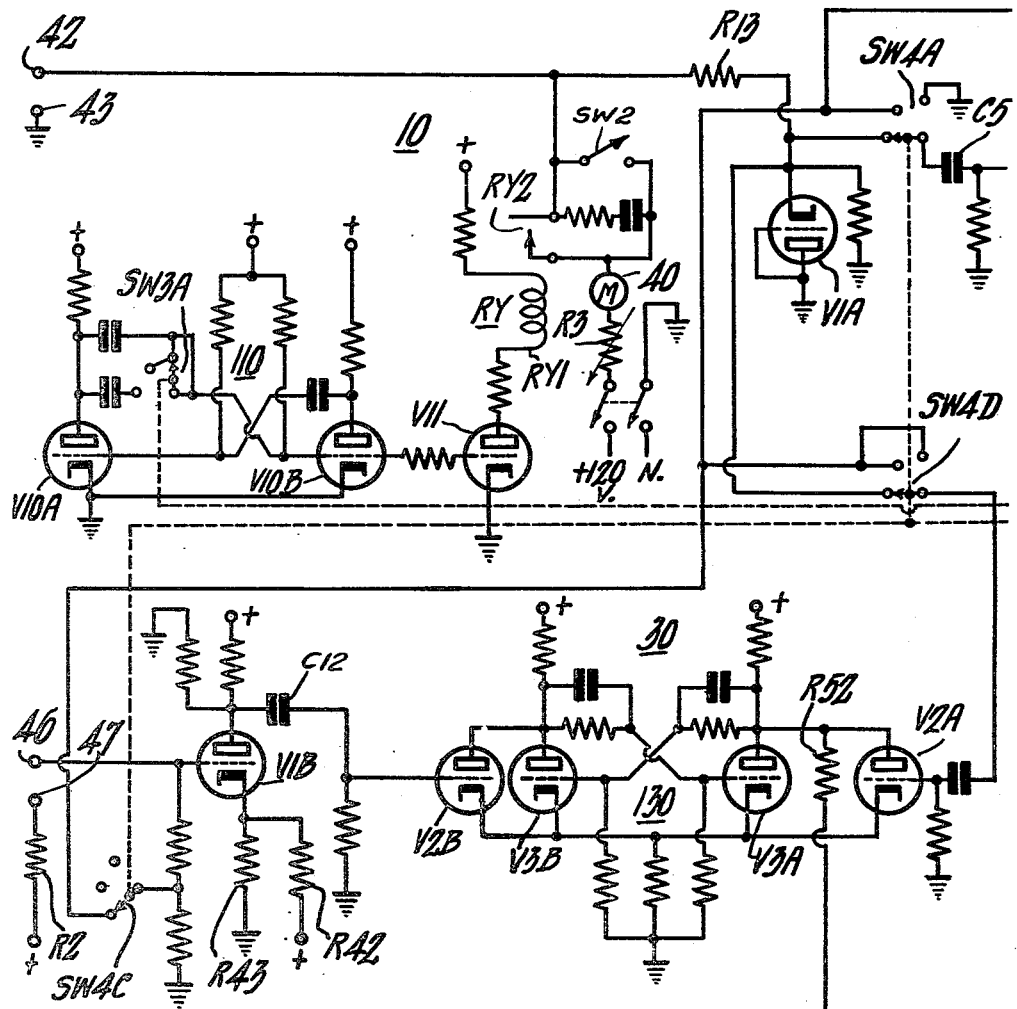

The TD output signals are applied at signal input terminals 46 and 47 to the grid of an input tube V1B. As shown in Fig. 2(a) the marking elements and the stop element are at +27 volts, in effect, as though terminals 46 and 47 were short-circuited, and the spacing elements and the start elements are at ground or zero volts. The input tube V1B has cathode bias supplied by divider resistors R42 and R43 so that when the grid of the input tube is at ground potential, the tube V1B will be cut off. Thus, while the brush of the TD is contacting the stop element, the tube V1B will be conducting, as soon as the brush contacts the start segment, the input tube V1B will be cut off. Cutting off the signal input tube V1B results in a positive pulse being applied through a capacitor C12 to the grid of a control tube V2B. The control tube V2B is normally cut off due to cathode bias. The positive pulse causes the control tube V2B to conduct and trigger a bistable reciproconductive circuit 130, comprised of the tubes V3A, V3B and associated components, including the control tube V2B and another control tube V2A, forming the first signal transition selector 30, to a condition whereby the tube V3B conducts and the reciproconductive tube V3A is blocked. The succeeding pulses do not change this condition. The action of the first signal transition selector 30 is thus seen to be as follows: Each time current is made to flow through the "eighth" pulse magnet, a voltage pulse is developed and applied through position 1 of another switch section SW4D of the function switch SW4 and a capacitor C15 to the grid of the other control tube V2A and triggers the first signal transition selector to the condition whereby the tube V3A is conducting and the tube V3B is blocked. Some time later a pulse from the input circuit triggers the transition selector 30 so that the tube V3B is conducting and the tube V3A is blocked. This is the selection of the first transition after application of the corresponding operating pulse. When the tube V3A is blocked, it generates a positive pulse which is coupled through a resistor R52 and a capacitor C16 to the grid of the tube V4B. This pulse is developed across the grid resistor R60. The values of these resistors R52 and R60 are such that the amplitude of the resulting pulse is big enough to override a small bias on the tube V4B but not big enough to override the large bias which is sometimes present.

With the resistance elements R24 and R35 adjusted so that the pulse reaching the grid of the tube V4B will always be coincident with a large bias voltage, the tube V4B will not conduct indicating that the active time of the delay generator 16 is equal to the delay and the duration of the pulse from the well generator 20 is equal to the clutching range. When the resistors R24 and R35 are in any other condition of adjustment, the pulse will reach the grid coincident with a low bias voltage and the tube V4B will conduct. Current flow through V4B triggers a monostable reciproconductive circuit 150, which constitutes the tripper 34, comprised of the tubes V5A and V5B, a neon glow lamp N3 and associated components. Since the glow lamp N3 is in the anode circuit of the tube V5A which conducts when the circuit is in its active position, the lamp N3 will glow for about 50 milliseconds every time a pulse causes the tube V4B to conduct. This serves as a visual indication that the controls R24 and R35 are not adjusted to indicate the measured time intervals correctly.

When the controls are very close to the indicating settings and it is desired to give the unit under test a more thorough and longer check, the operation may require constant viewing of the neon lamp. To relieve the operator of the possibility of mental fatigue, eye strain and the like, a circuit is provided which gives an audible indication. This circuit is a modified astable reciproconductive circuit or multi-vibrator 120 comprising the tubes V12A, V12B and associated components. The cathode of the tube V12A is at a positive potential and the grid of that triode is connected through resistor R65 to the anode of the tube V5B. The tube V5B is normally conducting and the anode voltage is less positive than the cathode of the tube V12A. The tube V12A is therefore cut off and the reciproconductive circuit 120 cannot oscillate. When a pulse through the tube V4B triggers the tripper 34, the tube V5B is cut off and the anode is at +150 volts. The tone generator 38 then oscillates. An output transformer 50 is included as part of the anode load of the tube V12B, therefore, when the circuit 120 is oscillating a speaker 52 will be energized and a tone will be heard, thereby avoiding the necessity of continually watching the lamp N3 when making a long time check.

Operational procedure

The operation of the circuit arrangement according to the invention may be better understood from the following description of the procedure to be followed in measuring the characteristics of a typical TD. The switch SW2 is closed, to cause current to flow through the "eighth" pulse coil. The amplitude of this current is then adjusted by means of the resistor R3 to give the proper operating current for the particular TD under consideration. This current is read on the meter 40. When the correct amount of current is flowing, the switch SW2 is released. The range switch SW3 is set to the No. 2 or 6–30 millisecond position, the delay time setting resistor R24 is adjusted to the maximum resistance position. The clutching range switch SW5 is set to the 4–20 millisecond position and the clutching range resistor R35 is adjusted to the maximum resistance position. The resulting waveform as seen at the cathode of the mixer tubes V4A, V4B is represented by the curve 301 in Fig. 3. $T_0$ on all curves is the reference time and corresponds to the leading edge of the "eighth" pulse. $T_1$ represents the maximum delay time on this setting of the delay range switch SW3 and is the active time of the delay generator monostable reciproconductive circuit 170, in this instance 30 milliseconds. The time $T_2T_1$ represents the maximum well time and is the active time of the well generator monostable reciproconductive circuit 190, in this instance 20 milliseconds. The "well" is inverted in this instance because the wave is applied to the cathodes while the pulses are applied to the grid. A look at the signal on the grid of the mixer tube V4B will reveal pulses somewhat as represented by the curve 303 in Fig. 2. The negative pulses will all coincide with $T_0$ since they are derived from the leading edge of the "eighth" pulse. The positive pulses are derived from the stop-to-start transitions applied to the tube V1B. There will be many pulses. The curve 303 only shows the extremes of these pulses; the pulse $P_1$ occurring closest in time to $T_0$ and the pulse $P_2$ occurring furtherest in time from $T_0$. All other pulses will occur between the pulses $P_1$ and $P_2$. By comparing the curve 303 with the curve 301, it will be seen that the pulses $P_1$ and $P_2$ occur in the period $T_0$ to $T_1$ or the low bias period in which the tubes V4A and V4B conduct, the lamp N3 glows and a tone is heard in the speaker 52. The next step is to shorten the time $T_0$ to $T_1$ by adjusting the resistor R24 to the point where the leading edge $T_1$ coincides with the pulse $P_1$ as represented by the curve 305. This is recognizable by the fact that the neon glow lamp N3 is extinguished. Any slight adjustment of the resistor R24 from this point should cause the lamp N3 to glow at varying intervals. Thus, pulses outside the "well," that is, pulses that are applied when no bias is applied will cause the tube V4B to conduct and the lamp N3 to flash. Pulses occurring within the "well" are not indicated in any way as the phasing of the pulses within the required operating tolerance is of little importance. With the controls in this condition of adjustment the minimum delay time, the period from $T_0$ to $P_1$ can now be determined. This is preferably marked on the dial associated with the delay time setting resistor R24, the multiplier setting of switch SW3, of course, being taken into account. The next step is to determine the clutching range. This is done by adjusting the clutching range resistor R35 to the point where the trailing edge $T_2$ coincides with the pulse $P_2$ as represented by the curve 307. This is recognizable by the fact that any further adjustment will result in the condition represented by the curve 309 and the lamp N3 will glow at varying intervals. With the resistor R35 set as described for the curve 307, the clutching range can be read on a calibrated dial associated with the resistor R35 and the multiplier setting of the clutching range switch SW5.

Position 3 of the switch SW3 is provided for checking special type transmitter-distributors having extremely long minimum delay time. A change in the "eighth" pulse frequency as accomplished by position 3 of switch SW3A is necessary to insure the completion of the full character signal to the first signal transition selector circuit before the inauguration of another "eighth" pulse. This insures that the selector has been returned by the stop-to-start transition and not by a mark-to-space transition in the intelligence elements. The procedure is then the same as outlined above.

Calibration

Means to check the accuracy of the dial setting and also to calibrate the dials when tubes are changed are available. The only external equipment needed is an accurate source of positive pulses of known duration. The frequency of the pulses should be very low, of the order of 3 or so cycles per second. The calibrating pulses are applied between the terminal 46 and ground. The use-calibrator switch S4 is set to position # 2, the delay calibrate position. This, in effect, substitutes the incoming pulse for the "eighth" pulse as a drive and reference for the delay generator 16 and the first signal transition selector 30. The resistor R35 and the switch SW5 can be set for approximately a 5 millisecond "well." If the incoming pulses are between 2 and 10 milliseconds then the switch SW3 is set to position #1. The resistor R24 is set to maximum resistance position and then slowly varied until the neon glow lamp N3 just remains out. The reading on the dial is then compared to the known duration of the input pulse. If it is not exactly the same, the dial is set to the correct figure and the resistor R17 is adjusted until the neon lamp just goes out. If the lamp is already out, the resistor R17 is adjusted until the lamp just glows and then turned back slightly until the lamp just goes out. A check on the other positions of switch SW3 will check whether capacitors C7 and C8 have been correctly chosen. The value of capacitor C7 should be exactly three times the value of capacitor C6 and the value of capacitor C8 should be exactly twelve times the value of capacitor C6.

To calibrate the well generator 20, the switch SW4 is set to its #3 position, the clutch calibrate position. In this position, the input pulses bypass the delay generator 16 and are applied directly to the well generator 20. The procedure is the same as for calibrating the delay generator except that the resistor R35 is adjusted instead of the resistor R24 to check the accuracy of the dial reading, and the resistor R28 is rotated to bring the dial to its correct setting.

The following component parts were used in an embodiment of the invention constructed along the lines shown in Fig. 2 and arranged for testing transmitting distributors having delay periods of 2–120 milliseconds and clutching ranges of 2–20 milliseconds. Obviously other values may be used for other types of distributors.

Tubes

| Reference Number | Type |
| --- | --- |
| V1A-B | 6SN7. |
| V2A-B | 6SL7. |
| V3A-B | 6SN7. |
| V4A-B | 6SL7. |
| V5A-B | 6SN7. |
| V6A-B | 6SL7. |
| V7A-B, V8A-B, V9A-B, V10A-B | 6SN7. |
| V11 | 6SN7 (parallel connected). |
| V12A-B | 6SN7. |
| N-3 | NE-51 Neon. |

Capacitors

| Reference No. | Value | unit | Reference No. | Value | unit |
| --- | --- | --- | --- | --- | --- |
| C5 | 0.001 | μfd. | C9 | 0.001 | μfd. |
| C6 | 0.034 | μfd. | C12 | 0.01 | μfd. |
| C7 | 0.1 | μfd. | C15 | 0.001 | μfd. |
| C8 | 0.4 | μfd. | C16 | 15 | μμfd. |

Resistors

| Reference No. | Value | unit | Reference No. | Value | unit |
| --- | --- | --- | --- | --- | --- |
| R3 | 1 | Megohm | R42 | 150 | Kilohms. |
| R13 | 51 | Kilohms | R43 | 22 | Do. |
| R17 | 25 | do | R52 | 470 | Do. |
| R24 | 100 | do | R60 | 330 | Do. |
| R35 | 100 | do | R65 | 470 | Do. |

Miscellaneous

| | | |
| --- | --- | --- |
| Relay RY | Clare Type J | 4 Kilohm coil. |
| Meter M | | 0–500 ma. |

A single voltage-regulated power supply delivering 150 volts at approximately 33 ma. was used with the positive terminal conected at + and the negative terminal connected to ground.

The invention claimed is:

1. A circuit arrangement for measuring the operating time of telegraph transmitting distributors of the type requiring an externally generated operating pulse, including means to generate a train of operating pulses, means to apply said operating pulses to the telegraph transmitting distributor under test, means responsive to application of said operating pulse train to derive a train of pulses delayed in time with respect to said operating pulses, means to vary the delay time, means responsive to said delayed pulses to produce pulses of extensive duration, means to vary the duration of said produced pulses, an input circuit, means to apply signal transitions from said distributor under test to said input circuit, means coupled to said operating pulse generator and to said input circuit to select the first transition after application of the corresponding operating pulse and form corresponding transition pulses, means to combine said corresponding transition pulses and said produced pulses, and means to indicate the time relationships between said corresponding transition pulses and said produced pulses.

2. A circuit arrangement for measuring the operating time of telegraph transmitting distributors of the type requiring an operating pulse generated externally of the distributor, including means to generate a train of operating pulses, means to vary the repetition rate of said operating pulses, means to vary the value of the current output of said pulse generating means, means to apply said operating pulses to the telegraph transmitting distributor under test, a delay generator responsive to application of said operating pulse train to derive a train of pulses delayed in time with respect to said operating pulses, means to vary the delay time, a circuit interposed in said delay generator to maintain the amplitude of said derived pulses substantially constant regardless of repetition rate, a well generator responsive to said delayed pulses to produce pulses of extensive duration, means to vary the duration of the pulses produced by said well generator, an input circuit, means to apply signal transitions from said distributor under test to said input circuit, means coupled to said operating pulse generator and to said input circuit to select the first transition after application of the corresponding operating pulse and form corresponding transition pulses, means to combine said corresponding transition pulses and said produced pulses, and means to indicate the time relationships between said corresponding transition pulses and the edges of said produced pulses.

3. A circuit arrangement for measuring the operating time of telegraph transmitting distributors of the type requiring an operating pulse generated externally of the distributor, including means to generate a train of operating pulses at a repetition rate slightly less than normal character rate, means to vary the repetition rate of said operating pulses, means to vary the value of the current output of said pulse generating means, means to apply said operating pulses to the telegraph transmitting distributor unter test, means responsive to application of said operating pulse train to derive a train of pulses delayed in time with respect to said operating pulses, means to vary the delay time, means to maintain the amplitude of said derived pulses substantially constant regardless of repetition rate, means responsive to said delayed pulses to produce pulses of extensive duration, means to vary the duration of said produced pulses, an input circuit, means to apply signal transitions from said distributor under test to said input circuit, means coupled to said operating pulse generator and to said input circuit to select the stop-to-start transition after application of the corresponding operating pulse and form corresponding transition pulses, means to combine said corresponding transition pulses and said produced pulses, means to indicate the time relationships between said corresponding transition pulses and the edges of said produced pulses, and means to make said time relationships visible and audible.

4. A circuit arrangement for measuring the operating time of telegraph transmitting distributors of the type requiring an operating pulse for initiating operation, including a delay generator comprising a monostable reciproconductive circuit having a stable state and a quasi-stable or active state of conduction and means to vary the duration of said active state, means to apply the operating pulse to said delay generator to trigger the reciproconductive circuit to the active state, a gating pulse generator comprising another monostable reciproconductive circuit having a stable and a quaisi-stable or active state of conduction and means to vary the duration of said active state, said gating pulse generator being coupled to said delay generator to trigger the former to the active state upon restoration of the latter to the stable state, a signal element transition detector comprising a bistable reciproconductive circuit having two active states of conduction, means to apply said operating pulse to said bistable reciproconductive circuit to trigger the same to one of said stable states and means to apply the signal output of the transmitting distributor under test to said bistable reciproconductive circuit to trigger the same to the other stable state of conduction, a mixer circuit, means to apply the output of said gating pulse generator and the output of said signal element transition detector to said mixer circuit, and an indicator device coupled to said mixer circuit.

5. A circuit arrangement for measuring the operating time of telegraph transmitting distributors of the type requiring an operating pulse for initiating operation, including a delay generator comprising a monostable reciproconductive circuit having a stable state and a quasi-stable or active state of conduction and variable resistive means to vary the duration of said active state, means to apply the operating pulse to said delay generator to trigger the reciproconductive circuit to the active state, a gating pulse generator comprising another monostable reciproconductive circuit having a stable state and a quasi-stable or active state of conduction and variable resistance means to vary the duration of said active state to form a gating pulse, said gating pulse generator being coupled to said delay generator to trigger the former to the active state upon restoration of the latter to the stable state, a signal element transition detector comprising a bistable reciproconductive circuit having two active states of conduction, means to apply said operating pulse to said bistable reciproconductive circuit to trigger the same to one of said stable states and means to apply the signal output of the transmitting distributor under test to said bistable reciproconductive circuit to trigger the same to the other stable state of conduction thereby to derive signal pulses of time duration relatively short with respect to the duration of the active states of said monostable reciproconductive circuits, a mixer circuit, means to apply said gating pulse and said signal pulse to said mixer circuit and an indicator device coupled to said mixer circuit to indicate when said signal pulses occur outside the limits of said gating pulse as determined by adjustment of said resistive and said restistance means.

6. A circuit arrangement for measuring the operating time of telegraph transmitting distributors of the type requiring an operating pulse for initiating operation, including a delay generator comprising a monostable reciproconductive circuit having a stable state and a quasi-stable or active state of conduction and means to vary the duration of said active state, means to apply the operating pulse to said delay generator to trigger the reciproconductive circuit to the active state, a gating pulse generator comprising another monostable reciproconductive circuit having a stable state and a quasi-stable or active state of conduction and means to vary the duration of said active state, said gating pulse generator being coupled to said delay generator to trigger the former to the active state upon restoration of the latter to the stable state, a signal element transition detector comprising a bistable reciproconductive circuit having two active states of conduction, means to apply said operating pulse to said bistable reciproconductive circuit to trigger the same to one of said stable states and means to apply the signal output of the transmitting distributor under test to said bistable reciproconductive circuit to trigger the same to the other stable state of conduction, a mixer circuit, means to apply the output of said gating pulse generator and the output of said signal element transition detector to said mixer circuit and a tripper circuit comprising a monostable reciproconductive circuit having a quasi-stable state of conduction coupled to said mixer tube, an indicator device coupled to said tripper circuit.

7. A circuit arrangement for measuring the operating time of telegraph transmitting distributors of the type requiring an operating pulse for initiating operation, including a delay generator comprising a monostable reciproconductive circuit having a stable state and an active state of conduction and a variable resistance element to vary the duration of said active state, means to apply the operating pulse to said delay generator to trigger the reciproconductive circuit to the active state, a gating pulse generator comprising another monostable reciproconductive circuit having a stable state and an active state of conduction and a variable resistive element to vary the duration of said active state to form a gating pulse, said gating pulse generator being coupled to said delay generator to trigger the former to the active state upon restoration of the latter to the stable state, a signal element transition detector comprising a bistable reciproconductive circuit having two active states of conduction, means to apply said operating pulse to said bistable reciproconductive circuit to trigger the same to one of said stable states and means to apply the signal output of the transmitting distributor under test to said bistable reciproconductive circuit to trigger the same to the other stable state of conduction thereby to derive signal pulses of time duration relatively short with respect to the duration of the active states of said monostable reciproconductive circuits, a mixer circuit comprising a mixer tube, having a cathode, a grid and an anode means to apply the output of said gating pulse generator to the cathode and means to apply the output of said transition detector to the grid of said mixer tube, a tripper circuit comprising a monostable reciproconductive circuit having a quasi-stable state of conduction coupled to the anode of said mixer tube, a neon lamp indicator device coupled to said tripper circuit, whereby said neon lamp is made to strike only when said signal pulses are applied to the grid of the mixer tube at a time other than during the application of said gating pulse to the cathode.

8. A circuit arrangement for measuring the operating time of telegraph transmitting distributors of the type requiring an operating pulse for initiating operation, including a delay generator comprising a monostable reciproconductive circuit having a stable state and an active state of conduction and a variable resistance element to vary the duration of said active state, means to apply the operating pulse to said delay generator to trigger the reciproconductive circuit to the active state, a gating pulse generator comprising another monostable reciproconductive circuit having a stable state and an active state of conduction and a variable resistive element to vary the duration of said active state to form a gating pulse, said gating pulse generator being coupled to said delay generator to trigger the former to the active state upon restoration of the latter to the stable state, a signal element transition detector comprising a bistable reciproconductive circuit having two active states of conduction, means to apply said operating pulse to said bistable reciproconductive circuit to trigger the same to one of said stable states and means to apply the signal output of the transmitting distributor under test to said bistable reciproconductive circuit to trigger the same to the other stable state of conduction thereby to derive signal pulses of time duration relatively short with respect to the duration of the active states of said monostable reciproconductive circuits, a mixer circuit comprising a mixer tube having a cathode, a grid and an anode, means to apply the output of said gating pulse generator to the cathode and means to apply the output of said transition detector to the grid of said mixer tube, a tripper circuit comprising a monostable reciproconductive circuit having a quasi-stable state of conduction coupled to the anode of said mixer tube, a tone generator comprising an astable reciproconductive circuit coupled to said monostable reciproconductive circuit, and a loudspeaker interposed in said astable reciproconductive circuit thereby to render the translation of pulses from said mixer circuit to said tripper circuit audible only when said signal pulses are applied to the grid of the mixer tube at a time other than during the application of said gating pulse to the cathode.

9. A circuit arrangement for measuring the operating time of telegraph transmitting distributors of the type requiring an operating pulse for initiating operation, including a delay generator comprising a monostable reciproconductive circuit having a stable state and an active state of conduction and a variable resistance element to vary the duration of said active state, means to apply the operating pulse to said delay generator to trigger the reciproconductive circuit to the active state, a gating pulse generator comprising another monostable reciproconductive circuit having a stable state and an active state of conduction and a variable resistive element to vary the duration of said active state to form a gating pulse, said gating pulse generator being coupled to said delay generator to trigger the former to the active state upon restoration of the latter to the stable state, a signal element transition detector comprising a bistable reciproconductive circuit having two active states of conduction, means to apply said operating pulse to said bistable reciproconductive circuit to trigger the same to one of said stable states and means to apply the signal output of the transmitting distributor under test to said bistable reciproconductive circuit to trigger the same to the other stable state of conduction thereby to derive signal pulses of time duration relatively short with respect to the duration of the active states of said monostable reciproconductive circuits, a mixer circuit comprising a mixer tube having a cathode, a grid and an anode, means to apply the output of said gating pulse generator to the cathode and means to apply the output of said transition detector to the grid of said mixer tube, a tripper circuit comprising a monostable reciproconductive circuit having a quasi-stable state of conduction coupled to the anode of said mixer tube, a tone generator comprising an astable reciproconductive circuit coupled to said monostable reciproconductive circuit, a neon lamp indicator device coupled to said tripper circuit, whereby said neon lamp is made to strike only when said signal pulses are applied to the grid of the mixer tube at a time other than during the application of said gating pulse to the cathode, and a loudspeaker interposed in said astable reciproconductive circuit thereby to render the translation of pulses from said mixer circuit to said tripper circuit audible.

References Cited in the file of this patent

UNITED STATES PATENTS

| Number | Name | Date |
|---|---|---|
| 2,370,685 | Rea et al. | Mar. 6, 1945 |
| 2,536,193 | Locke | Jan. 2, 1951 |
| 2,558,189 | Meacham | June 26, 1951 |